United States Patent Office 2,779,720
Patented Jan. 29, 1957

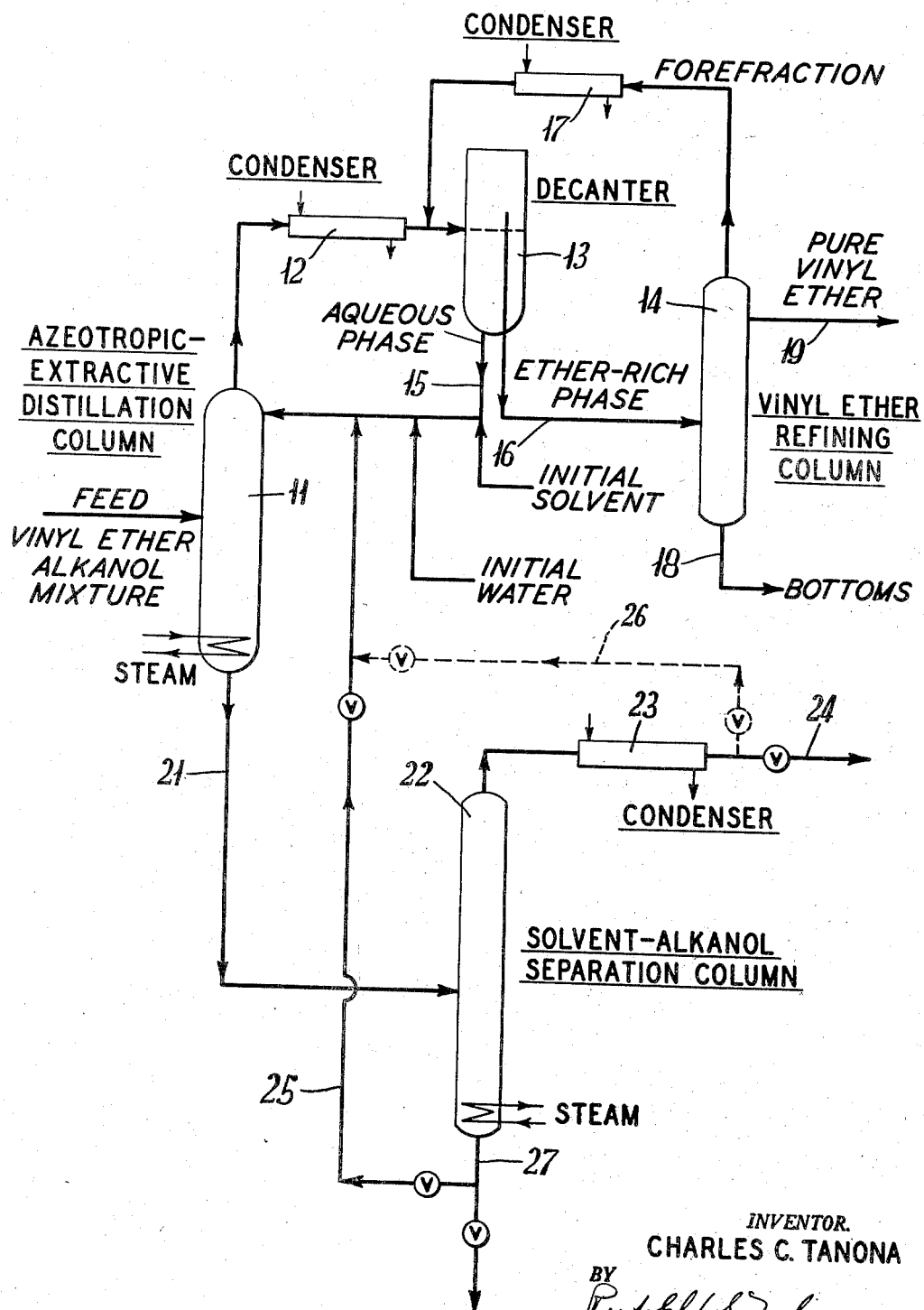

2,779,720

SEPARATION OF VINYL ETHERS BY DISTILLATION

Charles C. Tanona, Charleston, W. Va., assignor to Union Carbide and Carbon Corporation, a corporation of New York Application December 9, 1955, Serial No. 552,069

9 Claims. (Cl. 202—39.5)

This invention relates to a process for the separation by distillation of a vinyl ether from a difficultly separable mixture of the vinyl ether and a hydroxyl-containing aliphatic compound. More specifically, the invention relates to a process for the separation of vinyl alkyl and vinyl alkoxyalkyl ethers from a constant-boiling mixture or a close-boiling mixture of the vinyl ether and an aliphatic alkanol, such as alcohols and alkoxyalcohols, which includes the steps of heating the mixture of the alkanol and the vinyl ether in a distillation unit to about a temperature at which the mixture vaporizes while bringing the mixture into contact with two liquids, one of which forms a low boiling azeotropic mixture with the vinyl ether and the other of which is capable of depressing the volatility of the alkanol. The low boiling azeotropic vapors formed are removed overhead, condensed and the vinyl ether in the condensate separated from the azeotrope-forming compound. At the same time as the low boiling azeotropic vapors are being removed overhead, the mixture of the alkanol and the liquid depressing the volatility of the alkanol can be removed as bottoms from the distillation column. This mixture can be separately distilled to recover the alkanol, if desired.

One of the methods for the production of vinyl alkyl ether and vinyl alkoxyalkyl ethers is through the addition of acetylene to an aliphatic alkanol, such as alcohols and alkoxy alcohols. A characteristic of vinyl ethers prepared in this manner is that they form a constant boiling mixture with the starting alkanols or have a boiling point so close to the alkanol that separation of the components of such mixtures is difficult by ordinary physical methods. Thus, any attempt at ordinary distillation methods for recovery of the vinyl ether will result in a mixture containing the vinyl ether and the starting alkanol.

For most applications of the vinyl ethers, such as for monomers in polymer chemistry or as intermediates in organic synthesis, it is necessary that the vinyl ether be substantially free of the alkanol. The presence of the alkanol in a reaction of the vinyl ether interferes with the principal reaction through undesirable side reactions and attendant loss of vinyl ether. Therefore, special methods for the separation of the vinyl ether from the alkanol must be employed. Satisfactory methods for separation of vinyl ethers having 8 or more carbon atoms in the alkyl or alkoxyalkyl group are relatively non-existent and known methods for the separation are for the most part unsatisfactory for obtaining high purity vinyl ethers. It is known that some alkanols can be separated from vinyl ethers by solvent extraction or by azeotropic distillation methods. However, such methods are generally applicable only to lower vinyl ethers, such as those having less than 8 carbon atoms in the alkyl or alkoxyalkyl group. The problems involved in separating vinyl ethers from the corresponding alkanol increases greatly in complexity with an increase in the molecular weight of the vinyl ether such that vinyl ether of higher alkanols having more than 8 carbon atoms are extremely difficult to separate and purify by physical means.

Solvent extraction, for example, when applied to vinyl ethers of such higher alkanols is generally unsuccessful because of the similarity of solubility characteristic of these higher vinyl ethers with the corresponding alkanols. Where such a method is operable, the solvent is generally limited to the separation of one specific vinyl ether and is not operable over a broad range of higher vinyl ethers. Azeotropic distillation methods likewise are relatively unknown and unsuitable for use on vinyl ethers of higher alkanols for similar reasons. Each of the vinyl ethers of higher alkanols becomes a specific problem and a specific azeotroping agent would be required in each case.

It is also known that alkanols can be removed from mixtures with the vinyl ethers by chemical reaction, such as with metallic sodium to tie up the alkanol as the sodium alcoholate, or by promoting the condensation of the alkanol with some of the vinyl ether to form the acetal by the addition of an acidic condensation agent. However, such methods are generally expensive and result in loss of some of the vinyl ether. Therefore, such methods are generally not used in production operations and are restricted to laboratory preparations.

It is, therefore, an object of this invention to provide an improved method for the separation of vinyl alkyl and vinyl alkoxyalkyl ethers from mixtures thereof with aliphatic alkanols by a distillation operation, which method is applicable over a wide range of vinyl ethers having from 3 to 14 carbon atoms in the alkyl or alkoxyalkyl group.

According to the present invention, a vinyl alkyl ether or a vinyl alkoxyalkyl ether can be separated by distillation from mixtures thereof with an aliphatic alkanol by the concurrent use in the following described manner of two liquids, one of which forms a low boiling azeotropic mixture with the vinyl ether and the other simultaneously serving as a solvent to depress the volatility of the alkanol in the mixture. I have discovered that when a vinyl ether-alkanol mixture is vaporized in a distillation column and the ascending vapors are brought into intimate contact with two such liquids flowing downwardly and countercurrently to the ascending vapors in the column, that low boiling azeotropic vapors are formed between the vinyl ether and azeotrope-forming liquid. By removing and condensing these vapors the vinyl ether can be recovered substantially free of the alkanol present in the feed mixture. The solvent capable of depressing the volatility of the alkanol descends through the distilling column with the alkanol and the mixture of the two liquids are removed from the bottom of the column substantially free of vinyl ether. The alkanol and the volatility depressing solvent can be separately recovered, preferably by distillation, and the solvent reused in the distillation column, although such is not necessary to practice the main aspect of this invention.

I have found that water is an ideal azeotrope forming agent for the vinyl ether for use in this process. It is capable of forming a low boiling azeotropic mixture with a wide range of vinyl alkyl and vinyl alkoxyalkyl ethers having from 3 to 14 carbon atoms in the alkyl or alkoxyalkyl groups. In the method of this invention, water is employed in an amount at least sufficient to form this low boiling azeotropic mixture with substantially all the vinyl ether present in the feed mixture, and feed rate of the water should be adjusted accordingly.

It is preferred that water be limited to the minimum amount necessary to form an azeotropic mixture with the vinyl ether since any unvaporized water will collect in the kettle of the column and be removed with the alkanol and the solvent. An excess of water not only adds to the load on the distillation column, but can also create difficulties in the subsequent separation of the alkanol and the solvent.

In the practice of this invention it is preferred that the water be introduced near the top of the column and at least above the point of the introduction of the vinyl ether-alkanol feed mixture to have maximum contact of water with the ascending vapors in the column.

I have further found that liquids suitable as solvents for use in this invention to depress the volatility of the alkanol in the feed mixture are water-soluble glycols and glycol ethers having a structure represented by the general formula $HO(CH_2CH_2O-)_xR^1$ where $R^1$ is selected from the class consisting of hydrogen, lower alkyl groups and lower alkoxyalkyl groups, such as those groups containing from 1 to about 6 carbon atoms, and $x$ is an integer no greater than 4, having a boiling point higher than the boiling point of the azeotropic mixture formed between the water and vinyl ether.

Preferred for use in the process of this invention are the glycol and glycol ethers having a boiling point at least 15° C. higher than the vinyl ether-water azeotropic mixture to minimize the amount of solvent carried over in the overhead mixture. It is further preferred that the boiling point of the solvent differ from the boiling point of the alkanol by at least 15° C. This solvent boiling point, however, may be either above or below the boiling point of the alkanol, and such differential is desired only to facilitate the subsequent separation by distillation of the solvent from the alkanol for reuse of the solvent, and for the purification of the alkanol, if such is desired. However, such boiling point differential is not critical to the operation of this process and is not necessary that the alkanol and solvent be separated in order for the process to be carried out.

The amount of solvent employed in the process of this invention is not narrowly critical, but is preferably used in amounts from about 5.0 to 50 times by volume the amount of water (85–98 percent by volume of total water and solvent) introduced in the distillation column. I have found that such amounts sufficiently depress the volatility of the alkanol, that at temperatures employed herein, the concentration of alkanol in the ascending vapors is insufficient to carry over in the overheads any appreciable amount of alkanol. The solvent may be added either in admixture with the water or separately as desired. It is preferred that the rate of feed of total water and solvent employed be from about 0.25 to about 5.0 times the rate of feed of the vinyl ether-alkanol mixture.

Representative of the class of preferred organic compounds of glycol and glycol ethers are ethylene glycol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, and diethylene glycol monobutyl ether, and the like. However, the dialkoxy-ethylene glycol monoalkyl ethers, the lower dialkoxy-diethylene glycol monoalkyl ethers and the lower dialkoxy ethers of tri- and tetraethylene glycols may be used.

This invention can be more fully understood by reference to the accompanying process diagram. This diagram illustrates one of the preferred methods adapted to carry out the process of this invention but is not to be construed as limiting the invention. In reference to the single attached drawing, 11 is the distillation column, 12 is a condenser and 13 a decanter. While it is desired to have the vinyl ether refining column 14, and the solvent-alkanol separation column 22, such are not critical to the operation of this separation operation. The solvent-alkanol separation column provides for the reuse of the solvent employed in the vinyl ether separation, thus making the continuous process economically advantageous. It also provides the alkanol sufficiently free of other components as to be useful for preparing more vinyl ether.

The process diagram of the drawing represents the separation of a vinyl ether from the corresponding alkanol using as the organic solvent a glycol or glycol ether which is higher boiling than both the vinyl ether-water azeotrope and the alkanol to be separated. This drawing also illustrates subsequent purification of the vinyl ether and the separation of the alkanol and the solvent for continuous reuse of the separated solvent. Such a process is illustrative of the separation of vinyl ethylhexyl ether from a mixture of the vinyl ethylhexyl ether and ethylhexanol using the monoethyl ether of diethylene glycol as a solvent, and also illustrative of the separation of vinyl butoxyethyl ether from a mixture of the vinyl butoxyethyl ether and butoxyethanol using ethylene glycol as the solvent, and others.

The feed mixture of the vinyl ether and the alkanol according to this drawing enters distillation column 11 at a point at or near the midpoint of the column, while the water and solvent enter at or near the top of the column. Heat is applied to the kettle or bottom of the column by either internal means such as steam coils or by external means such as a reboiler.

The components in the feed mixture are vaporized by this heat source, and ascend in the column. The water and solvent flowing downwardly in the column come in intimate contact with such ascending vapors. The water then forms an azeotropic vapor with the vinyl ether and the solvent dissolves the alkanol, depressing its volatility and the solvent and alkanol mixture then descend together in the column.

The azeotropic vapors continue to ascend in the column and are removed at the top vapor outlet and condensed in condenser 12 and fed by pipe line to decanter 13.

Vinyl ethers and the water exhibit a low mutual solubility in the liquid state and the components of the azeotropic mixture separate into an ether rich phase and an aqueous phase in the decanter. The aqueous phase then can be removed from the decanter and fed back to the top of column 11 through line 15 so as to be available to form additional azeotropic vapors with the vinyl ether then in the column. The recycle of this water is advantageously employed in the separation so that small amounts of vinyl ether dissolved in the water will not be lost.

The ether rich phase in the decanter can be removed and fed to the vinyl ether refining column 14 through line 16 to purify the vinyl ether to remove slight traces of water and solvent and any other minor contaminants possibly present. The forefraction of the vinyl ether refining column containing the water and glycol traces is advantageously returned to the decanter 13 through condenser 17. Where a solvent higher boiling than the vinyl ether is employed, such traces would be removed as tails 18 from refining column 14 along with any traces of other higher boiling materials. Pure vinyl ether is removed from column 14 through line 19 for use or storage.

The alkanol and solvent mixture in the distillation column 11 descends to the bottom of the column and is removed as bottoms 21. In a continuous process it is desirable to separate the alkanol and the solvent for reuse of the solvent and such separation is advantageously effected by distillation, such as shown in the drawing in the solvent-alkanol separation column 22. If the water in the vinyl ether separation is not maintained at that minimum amount necessary to form the azeotrope with the vinyl ether in the feed mixture, the excess unvaporized water remains with the solvent and alkanol and goes through the solvent-alkanol separation process.

The alkanol-solvent mixture and excess water, if present, are fed to this column at or near the midpoint, with a heat source at the bottom or kettle of the column. In the operation of this process using a solvent higher boiling than the alkanol, the alkanol and excess water, if present, are taken off overhead, condensed in condenser 23 and removed through line 24. The excess water must then be removed from the alkanol if it is desired to reuse the alkanol. In this case the presence of excess water makes necessary the additional step of separating the water and alkanol; whereas by maintaining the water in column 11 at the minimum amount, this additional step could be eliminated.

In some cases the separation of the solvent and alkanol is complicated by the presence of excess unvaporized water since a few of the alkanols and solvents can form constant boiling mixtures with water. Thus for these reasons, it is desired to maintain water at the minimum amount necessary to form the azeotrope with the vinyl ether.

The solvent in this separation in column 22, after being stripped of alkanol and excess water is removed as bottoms 27 and back to the top of column 11 through line 25 to again function to depress the volatility of more alkanol in the distillation column 11.

It is necessary, of course, to add the initial charge of solvent and water to the system to start up the process, and to adjust flow rates to maintain equilibrium and balance within the system. The system operates continuously after equilibrium is reached in the system, and practically no water or solvent is required to maintain these conditions since all fractions except excess water are recycled within the system.

Where it is desired to employ a solvent lower boiling than the alkanol, the operation of the vinyl ether separation remains unchanged although the solvent-alkanol recovery is reversed. Thus, in such a process the solvent-alkanol mixture, and any excess water if present, is removed from the distillation column 11 as bottoms and fed to the solvent-alkanol separation column 22 at or near the midpoint. The solvent, and excess water if present, is taken over as overheads and condensed in condenser 23 and recycled through line 26 back to the top of column 11. The alkanol is recovered as bottoms 27 from this separation.

This embodiment of my process is illustrative of the separation of vinyl ethylhexyl ether from a mixture of the vinyl ethylhexyl ether and ethylhexanol, using the monomethyl ether of ethylene glycol as the organic solvent and also of the process for the separation of vinyl hexyl ether from a mixture of the vinyl hexyl ether and hexanol using the monoethyl ether of ethylene glycol as the solvent.

It is permissible under the process of this invention for the azeotropic vapors removed overhead in column 11 to contain some amount of water not associated in the azeotropic mixture, and in fact this sometimes happens as some of these azeotropic mixtures form at about 95° to 100° C. However, in such a process this unassociated water separates in the decanter as the aqueous phase and is recycled back to the distillation column with no adverse effects on the operation of this process.

It is likewise permissible for the azeotropic vapors to contain minor amounts of the solvent since it likewise will separate in the aqueous phase in the decanter and be recycled back to the top of column 11. The presence of minor amounts of solvents indicates that the conditions of the distillation are slightly less than ideal, and can be corrected if desired by several means—by employing a higher boiling solvent, a distillation column having a greater number of theoretical plates, adjustment of the feed ratio of water and solvent to the distillation column, or improving the heat balance in the system.

It is also permissible for a minor amount of the alkanol to be carried over with the azeotropic mixture of water and vinyl ether, although the presence of alkanols in the vaporous mixture can be avoided for ideal operation of this separation process. Under optimum conditions of feed ratio of water and solvent to the column, use of a distillation column having a sufficient number of theoretical plates, proper heat balance and mechanical operation, alkanol carried over in the vapor can be eliminated.

The distillation column may be a multiple plate column, tray column, packed column or any of the innumerable modifications of such columns. For most separations, a column having about 15 or more theoretical plates is preferred. The column can be operated at subatmospheric pressures and most conveniently at atmospheric pressure. The decanter may be any vessel equipped to separate one liquid phase from another.

The temperature at which the distillation is conducted is not narrowly critical but should be at a temperature sufficient to vaporize the azeotrope of vinyl ether and water. These azeotropes can form within a wide range of temperatures, with a considerable number forming at around 95° C.–100° C. A few of the azeotropic mixtures which are encountered in this process between a vinyl ether and water are as follows:

| Vinyl Ether | Percent | Percent Water | Boiling pt., ° C. at 760 mm. |
| --- | --- | --- | --- |
| Vinyl propyl ether | 95.0 | 5.0 | 59.0 |
| Vinyl butyl ether | 88.4 | 11.6 | 77.5 |
| Vinyl 2-butoxyethyl ether | 47.2 | 52.8 | 97.0 |
| Vinyl 2-ethylhexyl ether | 40.9 | 59.1 | 97.8 |
| Vinyl trimethylnonyl ether | 15.7 | 84.3 | 99.6 |

The process of this invention is applicable to the separation of vinyl alkyl ethers and vinyl alkoxy-alkyl ethers from difficultly separable mixtures with aliphatic alcohols, and particularly to those vinyl ethers having from five to about sixteen carbon atoms. The process has particular advantage when employed to separate the vinyl ethers prepared by the vinylation of aliphatic alkanols. Such reactions result in unreacted alkanol contaminating the vinyl ether, which can be easily separated by my process to yield the vinyl ether substantially free of the alkanol.

This process can also be applied to other mixtures of vinyl ethers and alkanols such as may occur. One vinyl ether, vinyl 2-ethylhexyl ether, has been perhaps the most difficult ether to separate from the starting alkanol by processes heretofore employed in the art, but can be recovered by this process in high purity and almost quantitative yields, substantially free of the 2-ethylhexanol. The process has similar utility when employed to separate vinyl ethers of such alcohols as propyl, butyl, amyl, hexyl, heptyl, nonyl, decyl, and the like as well as the alkoxy substituted alcohols.

The following examples of this invention are illustrative. These examples were carried out in a 40 mm. O. D. glass distillation column consisting of two sections. The upper section was 480 mm. long and the lower section was 330 mm. long, both sections packed with stainless steel sponge. The feed stock of vinyl ether-alkanol mixture enters at the top of the lower section and the water and organic solvent enter at the top of the upper section. The column assembly was insulated with magnesia insulation to decrease heat loss. The top of the column was equipped with a water cooled condenser and a decanter to facilitate the separation of the liquid overheads product into the ether and aqueous phases. The aqueous phase was continuously recycled from the decanter to the top of the condenser. The bottom of the column was equipped with an electrically heated kettle and a constant leveling device to permit continuous removal of the alkanol-solvent bottoms product. The pressure in the column in all examples was maintained at atmospheric.

*Example 1*

A feed stock consisting of 85 percent by weight of vinyl 2-butoxyethyl ether and 15 percent of 2-butoxyethanol was fed into the distillation column at the inlet provided at the middle of the distillation column at a rate of 300 parts by volume per hour. The solvent used was ethylene glycol in admixture with 10 percent by volume of water and was fed into the column at the top of the column at a rate of 300 parts by volume per hour. The still kettle was heated electrically to a temperature of 120° C. while the vapor temperature, at the top of the column was maintained at 97° C. The overhead vapors, containing an azeotrope containing about 47 percent by weight of vinyl 2-butoxyethyl ether and 53 percent water were continuously removed and condensed and permitted to separate in a decanter. After equilibrium was reached in the column, the organic phase of the decanter was removed and redistilled under a vacuum of 10 mm. Hg at a temperature of 56° C. to remove any traces of water and solvent. The product analyzed at 98.8 percent pure vinyl 2-butoxyethyl ether.

*Example 2*

A feed stock consisting of 85 percent by weight of 2-ethylhexyl vinyl ether and 15 percent of 2-ethylhexanol was fed into the middle of the distillation column at the rate of 200 parts by volume per hour. Ethylene glycol monomethyl ether containing 10 percent by volume of water was fed into the top of the column at the rate of 820 parts by volume per hour. The kettle temperature was maintained at 107° C. and vapor temperature at 98° C. while continuously removing and condensing the overhead vapors, which contained an azeotrope containing approximately 41 percent vinyl 2-ethylhexyl ether and 59 percent water, was permitted to separate in a decanter. After equilibrium was reached in the column, the organic phase of the decanter was removed and redistilled under a vacuum of 10 mm. Hg at a temperature of 62° C. to remove any traces of water and solvent present. The product analyzed at 98.0 percent pure 2-ethylhexyl vinyl ether.

*Example 3*

A feed stock consisting of 84 percent by weight of 2-ethylhexyl vinyl ether and 16 percent 2-ethylhexanol was fed into the middle of the distillation column at a rate of 310 parts by volume per hour. Diethylene glycol monoethyl ether containing 10 percent water by volume was fed into the top of the column at a rate of 310 parts by volume per hour. Kettle temperature was maintained at 116° C. and vapor temperature at 97° C. while continuously removing and condensing the overhead vapors which contained an azeotrope containing approximately 41 percent vinyl 2-ethylhexyl ether and 59 percent water, was permitted to separate in a decanter. After equilibrium was reached in the column, the organic phase of the decanter was removed and redistilled under a pressure of 10 mm. Hg. to remove any traces of water and solvent present. The product analyzed at 95 percent pure 2-ethylhexyl vinyl ether. Increased solvent-to-feed ratio in this application or increased column efficiency gave a correspondingly higher purity of 2-ethylhexyl vinyl ether.

*Example 4*

A feed stock consisting of 84 percent by weight of vinyl 2-ethylhexyl ether and 16 percent of 2-ethylhexanol was fed into middle of the distillation column at a rate of 200 parts by volume per hour. Ethylene glycol monoethyl ether containing 10 percent by volume of water was fed to the top of the column at a rate of 490 parts by volume per hour. Kettle temperature was maintained at 107° C., and vapor temperature at 96° C. while continuously removing and condensing the overhead vapors which contained an azeotrope containing approximately 41 percent of the vinyl 2-ethylhexyl ether and 59 percent water, was permitted to separate in a decanter. The organic phase of the decanter contained the vinyl ether which analyzed at 97.0 percent pure 2-ethylhexyl vinyl ether.

I claim:

1. A process for separating an aliphatic vinyl ether from a mixture with an aliphatic alkanol which comprises heating said mixture in the presence of water sufficient to form a constant boiling mixture with substantially all the vinyl ether in the mixture, and an organic solvent having the general formula $HO(CH_2CH_2O-)_xR^1$, where $R^1$ is selected from the group consisting of hydrogen, lower alkyl, and lower alkoxyalkyl groups, and $x$ is an integer no higher than 4, and having a boiling point higher than the constant-boiling mixture of water and the vinyl ether, distilling overhead said constant boiling mixture, and condensing said mixture to recover the vinyl ether.

2. A process according to claim 1 wherein the vinyl ether contains from 5 to 16 inclusive carbon atoms.

3. A process for separating a vinyl ether made by vinylation of an aliphatic alkanol from a mixture with such alkanol, which comprises heating the mixture of vinyl ether and alkanol in the presence of water sufficient to form a constant boiling mixture with substantially all the vinyl ether in the mixture, and an organic solvent having the general formula $HO(CH_2CH_2O-)_xR^1$, where $R^1$ is selected from the group consisting of hydrogen, lower alkyl, and lower alkoxyalkyl groups, and $x$ is an integer no higher than 4, and having a boiling point higher than the constant boiling mixture of water and vinyl ether, distilling over said constant boiling mixture and condensing the mixture to recover the vinyl ether.

4. A process for continuously separating an aliphatic vinyl ether having from 5 to 16 inclusive carbon atoms from a mixture with an aliphatic alkanol, which comprises continuously distilling the mixture while adding water and an organic solvent and having the general formula $HO(CH_2CH_2O-)_xR^1$, where $R^1$ is selected from the group consisting of hydrogen, lower alkyl, and lower alkoxyalkyl groups and $x$ is an integer no higher than 4, the water being introduced at a rate at least sufficient to form a constant boiling mixture with substantially all of the vinyl ether present in the ether-alkanol mixture, said solvent selected so as to be higher boiling than the constant boiling mixture of water and vinyl ether, and said solvent introduced at a rate of from about 5 to about 50 parts of solvent per part of water and distilling overhead said constant boiling mixture, condensing and decanting said constant boiling mixture to recover the vinyl ether as the organic phase of the distillate.

5. A process for continuously separating a vinyl alkyl ether from a mixture with an aliphatic alcohol where the alkyl group of the vinyl alkyl ether and the alcohol have from 3 to 14 carbon atoms, which comprises continuously distilling the mixture while continuously adding water and an organic solvent having the general formula $HO(CH_2CH_2O-)_xR^1$ where $R^1$ is selected from the group consisting of hydrogen, lower alkyl, and lower alkoxyalkyl groups and $x$ is an integer no higher than 4, the water being introduced at a rate at least sufficient to form a constant boiling mixture with substantially all the vinyl alkyl ether present in the ether-alcohol feed mixture, said solvent selected so as to be higher boiling than the constant boiling mixture of water and vinyl alkyl ether, and said organic solvent introduced at a rate of from about 5 to about 50 parts of solvent per part of water introduced so as to flow countercurrently to the rising azeotropic vapors and at a feed rate of total solvent and water of from about 0.25 to about 5 times the feed rate of vinyl ether-alcohol feed mixture, distilling over said constant boiling mixture into a condenser and decanting the condensate for separation of the aqueous and organic phases and recovering the vinyl ether from the organic phase of said decanter, while the alcohol separated is removed at the bottom of said distillation column with the organic solvent.

6. A process for continuously separating a vinyl alkoxyalkyl ether from a mixture with the corresponding alkoxy alcohol where the alkoxyalkyl group of the vinyl alkoxyalkyl ether and alkoxy alcohol have from 3 to 14 inclusive carbon atoms, which comprises continuously distilling said mixture while continuously adding water and an organic solvent having the general formula $HO(CH_2CH_2O—)_xR^1$, where $R^1$ is selected from the group consisting of hydrogen, lower alkyl, and lower alkoxyalkyl groups, and $x$ is an integer no greater than 4, the water being introduced at a rate at least sufficient to form a constant boiling mixture with substantially all the vinyl alkoxyalkyl ether present in the feed mixture, said solvent selected so as to have a boiling point higher than the constant boiling mixture and said solvent introduced at a rate from about 5 to about 50 parts of solvent per part of water introduced so as to flow countercurrently to the rising azeotropic vapors and at a feed rate of total solvent and water of from about 0.25 to about 5.0 times the rate of feed of vinyl alkoxyalkyl ether-alkoxy alcohol feed mixture, distilling over said constant boiling mixture into a condenser and decanting the condensate for separation of the aqueous and organic phases and recovering the vinyl alkoxyalkyl ether in the organic phase of said decanter while the alkoxy alcohol is removed at the bottom of the distillation column with the organic solvent.

7. A process according to claim 5 wherein the aqueous phase of the said decanter is recycled to the upper part of said distillation column and the mixture of solvent and alcohol removed from the bottom of said distillation column is separated and the solvent recovered from the mixture is recycled to the upper part of said distillation column.

8. A process according to claim 6 wherein the aqueous phase of the said decanter is recycled to the upper part of said distillation column and the mixture of solvent and alkoxy alcohol removed from the bottom of said distillation column is separated and the solvent recovered from the mixture is recycled to the upper part of said distillation column.

9. A process for continuously separating a lower alkyl substituted hexyl vinyl ether from a mixture with the corresponding lower alkyl substituted hexanol which comprises distilling said mixture while continuously introducing water at a rate sufficient to form a constant boiling mixture with substantially all the said hexyl vinyl ether in the mixture, and continuously introducing an organic solvent having the general formula $$HO(CH_2CH_2O—)_xR^1,$$

where $R^1$ is selected from the group consisting of hydrogen, lower alkyl and alkoxyalkyl groups and $x$ is an integer no higher than 4, said solvent selected so as to have a boiling point higher than the constant boiling mixture, and introduced at a rate of from about 5 to about 50 parts of solvent per part of water, introduced so as to flow countercurrently to the rising azeotropic vapors, distilling overhead the constant boiling mixture, condensing and decanting said constant boiling mixture to recover the said hexyl vinyl ether as the organic phase of the condensate.

No references cited.